(12) United States Patent
Badino et al.

(10) Patent No.: US 9,714,684 B2
(45) Date of Patent: Jul. 25, 2017

(54) VENTILATED BRAKE DISK FOR A MOTOR VEHICLE

(71) Applicant: FCA Italy S.p.A., Turin (IT)

(72) Inventors: Renato Badino, Turin (IT); Stefano Luca, Turin (IT)

(73) Assignee: FCA Italy S.p.A., Turin (IT)

( * ) Notice: Subject to any disclaimer, the term of this patent is extended or adjusted under 35 U.S.C. 154(b) by 0 days.

(21) Appl. No.: 15/009,967

(22) Filed: Jan. 29, 2016

(65) Prior Publication Data

US 2016/0223036 A1    Aug. 4, 2016

(30) Foreign Application Priority Data

Jan. 29, 2015   (IT) .............................. TO2015A0066

(51) Int. Cl.
| | |
|---|---|
| *F16D 65/10* | (2006.01) |
| *F16D 65/00* | (2006.01) |
| *F16D 65/12* | (2006.01) |
| *F16D 65/02* | (2006.01) |

(52) U.S. Cl.
CPC ......... *F16D 65/0006* (2013.01); *F16D 65/12* (2013.01); *F16D 65/128* (2013.01); *F16D 2065/132* (2013.01); *F16D 2065/1328* (2013.01)

(58) Field of Classification Search
CPC ...... F16D 65/0006; B22D 19/00; B22D 19/12
USPC ................ 188/18 A, 218 XL, 218 A, 264 A, 188/264 AA
See application file for complete search history.

(56) References Cited

U.S. PATENT DOCUMENTS

| | | | |
|---|---|---|---|
| 3,292,746 A | 12/1966 | Robinette | |
| 3,425,523 A * | 2/1969 | Robinette | ........... F16D 65/0006 188/218 A |
| 3,861,501 A | 1/1975 | Brooks | |
| 5,004,078 A * | 4/1991 | Oono | ................... F16D 65/0006 188/218 A |
| 5,184,663 A * | 2/1993 | Oono | ..................... B22D 19/00 164/112 |
| 5,855,257 A | 1/1999 | Wickert | |
| 6,112,865 A * | 9/2000 | Wickert | .............. F16D 65/0006 188/218 A |
| 6,945,309 B2 * | 9/2005 | Frait | ...................... B22D 19/12 164/132 |
| 2005/0011628 A1 | 1/2005 | Frait | |

OTHER PUBLICATIONS

Search Report for Italian Application IT T020150066, 7 pages (3 in Italian) (Oct. 5, 2015).

* cited by examiner

*Primary Examiner* — Christopher Schwartz
(74) *Attorney, Agent, or Firm* — Greer, Burns & Crain, Ltd

(57) ABSTRACT

A ventilated brake disk for a motor vehicle has a rotor provided with two disks having respective inner faces, which are axially spaced apart and are joined to each other through a plurality of pins; the radially outermost end areas of the two faces axially define between them an annular passage, which houses the wavy intermediate portion of a wire damping element; this intermediate portion is elastically deformed in a direction parallel to the axis of the rotor so as to be forced against the disks; at its opposite ends, the wire damping element ends with two fastening portions which are radially inwardly bent with respect to the intermediate portion and are hooked to respective pins.

18 Claims, 3 Drawing Sheets

VENTILATED BRAKE DISK FOR A MOTOR VEHICLE

CROSS-REFERENCE TO RELATED APPLICATION

This application claims the benefit of Italian Patent Application Serial No. TO2015A000066, filed Jan. 29, 2015, and titled "Ventilated Brake Disk For A Motor Vehicle", which is incorporated herein by reference in its entirety.

FIELD OF THE INVENTION

The present invention relates to a ventilated brake disk for a motor vehicle.

BACKGROUND OF THE INVENTION

As already known, a ventilated brake disk is formed by two facing and mutually spaced disks, which are joined by a plurality of bridges or pins, radially and/or tangentially, spaced from each other. In this way, some cooling-promoting gaps are available between the two disks and around such pins.

As already known, the brake disk has its own natural resonance frequencies, which depend on its size, its mass and the characteristics of its material. These frequencies affect the vibrations of the brake disk and, therefore, the noisiness of the braking system. In particular, they can generate an annoying whistle when the brake pads contact the disk during braking.

Mounting a damping element on the brake disk to dampen the vibration, and therefore the noise, is already known.

U.S. Pat. No. 3,861,501 describes an elastic element having an intermediate portion arranged in a single gap between two successive pins of the brake disk. The elastic element further has a projecting end, which is coupled to the edge of a driving element arranged around the brake disk.

The solution shown in FIG. 10c of the document U.S. Pat. No. 5,855,257 corresponds to the preamble of claim 1 and teaches the use of a wire or sheet damping element, which has a wavy profile and is axially interposed between two disks of a rotor.

This solution, however, is not completely satisfactory. In fact, no measures in this solution allow securing permanently the damping element to the rotor. At the same time, the axial pre-load with which the damping element is arranged between the two disks is not sufficient to fasten it with respect to the rotor. In other words, the coupling provided in this solution allows the relative movement of the damping element with respect to the rotor. An undesired uncoupling of the damping element caused by the centrifugal acceleration can occur because of this relative movement.

Furthermore, said relative movement is likely to result in a counterproductive effect with regard to the occurrence of resonance frequencies, and thus with regard to the noisiness of the brake disk.

SUMMARY OF INVENTION

The object of the present invention is to provide a ventilated brake disk for a motor vehicle which simply and economically solves the aforesaid disadvantages.

According to the present invention, it is manufactured a ventilated brake disk for a motor vehicle as defined in claim 1.

BRIEF DESCRIPTION OF THE DRAWINGS

For a better understanding of the present invention it is now described a preferred embodiment, purely by way of a non-limiting example, with reference to the accompanying drawings, in which.

DETAILED DESCRIPTION OF THE INVENTION

Figure 1:
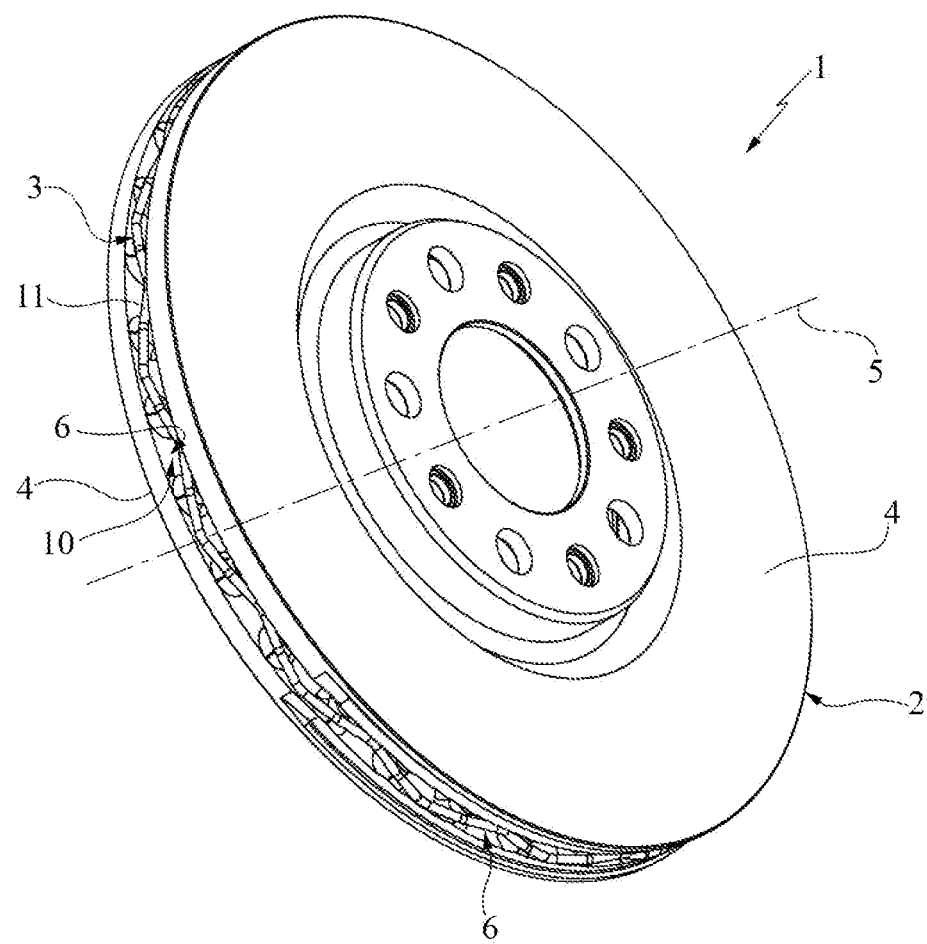
FIG. 1 is a perspective view of a preferred embodiment of the ventilated brake disk for a motor vehicle, according to the present invention.

In FIG. 1, the reference number 1 indicates a ventilated brake disk for a motor vehicle (not shown). The brake disk 1 is defined by two components, namely a rotor 2 and a damping element 3, fitted around the rotor 2.

The rotor 2 is of known type and comprises two disks 4, which are coaxial along an axis 5 and have respective inner faces 6, which are axially facing and mutually spaced.

The disks 4 are mutually joined by a plurality of pins or bridges 7 (visible in the section of FIG. 3), each of them extending from a face 6 to the other. The pins 7 are radially and/or tangentially mutually spaced, so as to form a gap or a network of channels 8 between the two faces 6, thus facilitating the cooling of the rotor 2.

The radially outermost end areas of the faces 6, together with those pins 7 which are arranged at the radially outermost positions, define an annular passage 10, where the channels 8 come out.

The passage 10 houses an intermediate portion 11 of the damping element 3.

Figure 2:
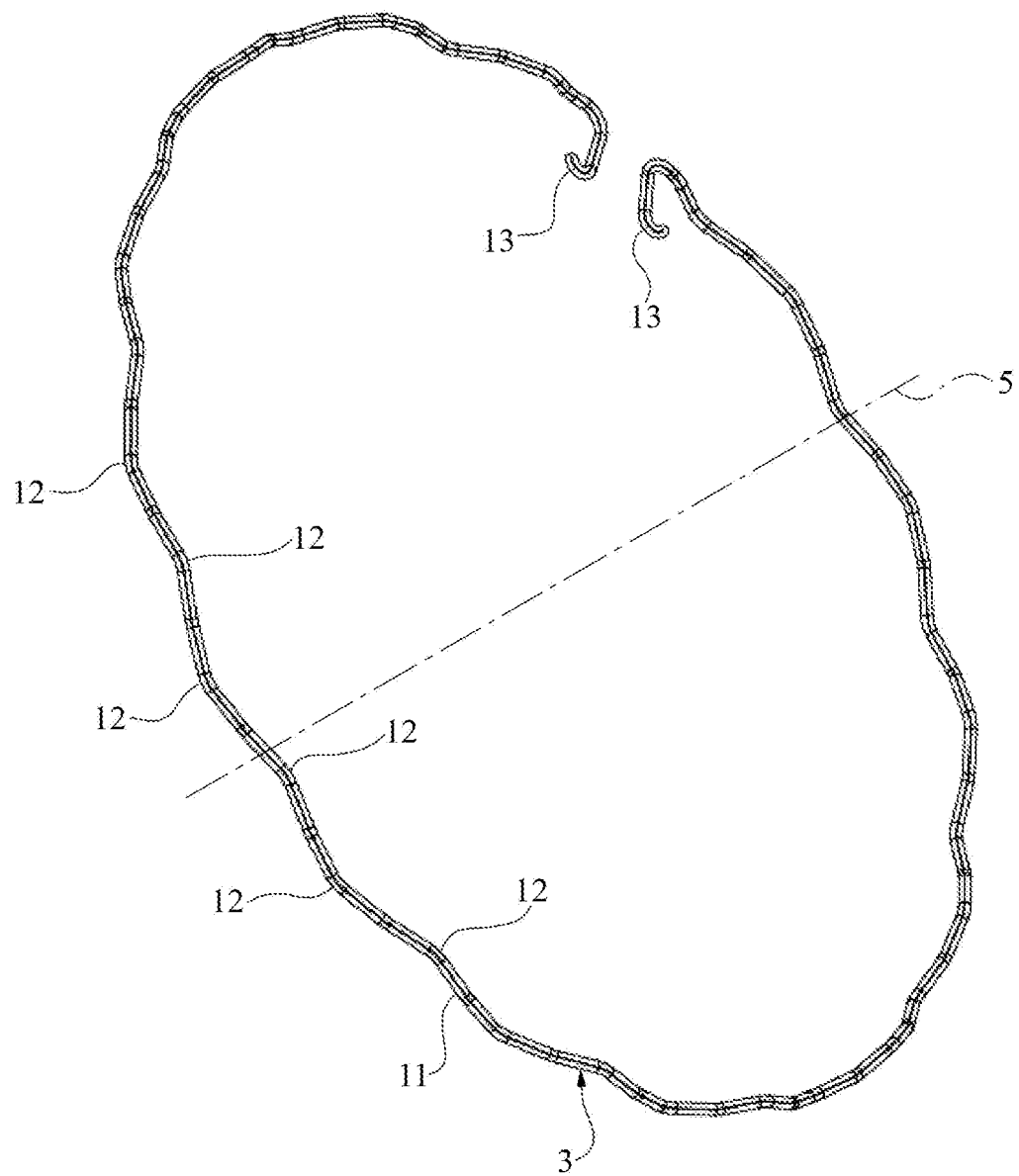
FIG. 2 shows a damping element of the brake disk of FIG. 1.

With reference also to FIG. 2, the damping element 3 is defined by a wire or a sheet of elastically deformable material, in particular metal material, having a constant cross section along its length. Said cross section may also be different from the cylindrical one which is shown by way of example.

The portion 11 has a wavy shape, with the wave tips 12 alternately resting against both faces 6, preferably directly, namely without elements interposed between the tips 12 and the faces 6.

The portion 11, when mounted in the passage 10, is pre-loaded in the direction parallel to the axis 5, i.e. it is elastically deformed to axially force the wave tips 12 against the faces 6. In other words, the portion 11 in the direction parallel to the axis 5 is smaller than when the portion 11 is in a non-deformed resting condition (e.g. before fitting the damping element 3 around the rotor 2). The pre-load is set ad hoc, for example through appropriate simulations, in order to optimize the vibration damping and reduce the noisiness of the brake disk 1.

Figure 3:
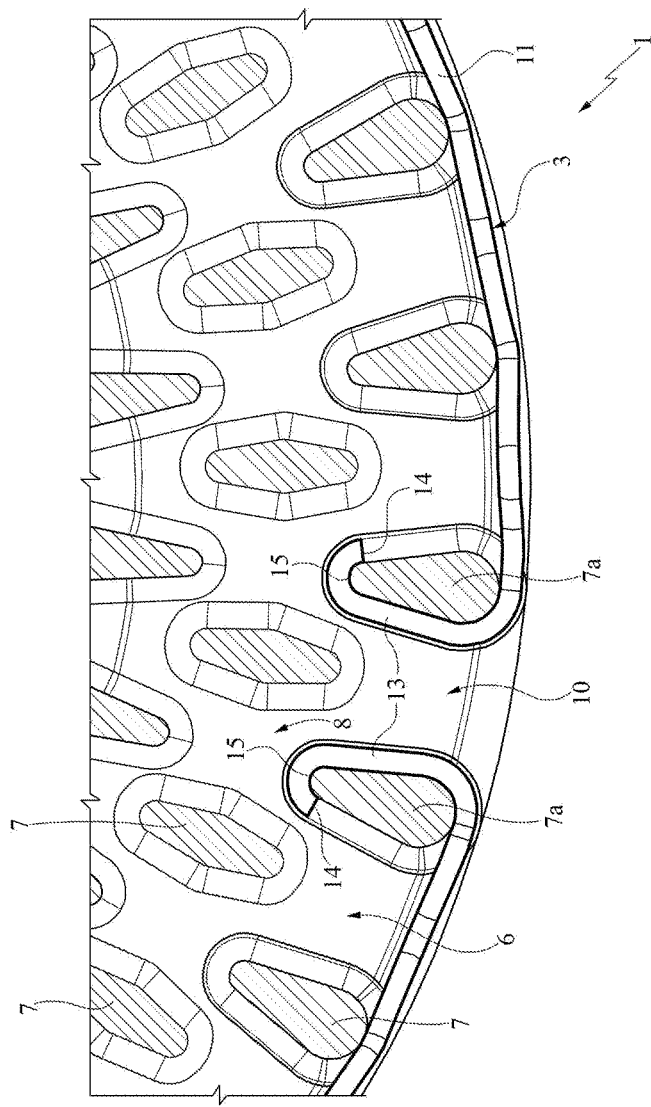
FIG. 3 is a section of the brake disk of FIG. 1, obtained through a section plane perpendicular to the axis of the brake disk, showing a detail in enlarged scale and with parts removed for sake of clarity.

With reference to FIG. 3, according to the present invention, at its opposite ends, the damping element 3 ends with respective fastening portions 13, which are radially bent towards the axis 5 with respect to the portion 11 and to the passage 10 in order to engage a channel 8. The portions 13 rest, in the tangential direction, against respective pins 7a so as to stop any movement of the damping element 3 with respect to the rotor 2 about the axis 5.

Preferably, at least one of the fastening portions 13 is hook-shaped so as to end with a tip 14 facing radially outwards, i.e. towards the portion 11 and the passage 10. In this way, the portion or hook 13 wraps a radially inner end 15 of the corresponding pin 7a for a more secure fastening. In fact, in this way an undesired uncoupling of the damping element 3, due for example to the centrifugal acceleration acting on the brake disk 1 during the running of the motor vehicle, is avoided. Preferably, both portions 13 are hook-shaped.

Again, with reference to FIGS. 2 and 3, the damping element 3 surrounds the rotor 2 about the axis 5 by an angle relatively near to 360°, in order to ensure that the brake disk 1 is as rotation-balanced as possible under dynamic conditions. According to a variant not shown, the brake disk 1 may comprise two or more damping elements, analogous to the aforesaid element 3, although shorter, each of which mounted on a respective section of the rotor 2. The arrangement of such damping elements must be such as to obtain a disk brake as rotation-balanced as possible.

Obviously, in this case, the portions 13 of each damping element 3 engage respective channels 8 which are peripherally spaced apart about the axis 5.

As mentioned above, by providing the portions 13 at the ends of the element 3, the portion 11 is fastened in the passage 10 in a substantially fixed position. In particular, the shape of the hook-shaped portions 13 effectively prevents a possible uncoupling of the pins 7 caused by the centrifugal acceleration.

Regardless of the optimal shape selected for the portions 13, they allow an improved coupling to the rotor 2 with respect to the known art, and as a consequence an improvement with regard to the vibration damping.

From the above it is, finally, evident that the described and illustrated brake disk 1 can be subject to modifications and variants which do not depart from the scope of protection of the present invention as defined in the appended claims.

In particular, as mentioned above, the shape of the portions 13 may be slightly different from what illustrated by way of example.

The invention claimed is:

1. A ventilated brake disk for a motor vehicle, comprising:
  a rotor comprising two disks, coaxial along an axis and having respective faces, which are axially spaced apart and are joined to each other by means of a plurality of pins, tangentially defining between them a plurality of channels; the radially outermost end areas of said faces axially defining an annular passage between them, where said channels come out;
  at least one wire damping element made of elastically deformable material and comprising an intermediate portion which is arranged in said annular passage, has a wavy profile and is elastically deformed in the direction parallel to said axis so as to be forced against said faces;
  wherein, at its opposite ends, said wire damping element ends with respective fastening portions which are radially inwardly bent with respect to said intermediate portion to engage at least a channel and rest against respective pins in the tangential direction.

2. A brake disk according to claim 1, wherein said fastening portions are exclusively coupled to said rotor.

3. A brake disk according to claim 2, wherein said fastening portions are exclusively coupled to said pins.

4. A brake disk according to claim 1, wherein said wire damping element has a constant cross section along its entire length.

5. A brake disk according to claim 1, wherein at least one of said fastening portions is hook-shaped, so as to terminate with a tip directed radially outward, and is wound around a radially inner end of said corresponding pin.

6. A brake disk according to claim 5, wherein both said fastening portions are hook-shaped.

7. A brake disk according to claim 1, wherein the brake is defined by said rotor and by said wire damping element; and wherein said wire damping element is wound around said rotor by an angle close to 360°.

8. A brake disk according to claim 1, wherein said intermediate portion consists of a plurality of waves whose tips directly rest onto said faces.

9. A brake disk according to claim 1, wherein both fastening portions are hook-shaped, so as to terminate with a respective end directed radially outward, and wherein the wire damping element near each end is wound around a radially inner end of a corresponding pin.

10. A ventilated brake disk for a motor vehicle, comprising:
  a rotor comprising two disks, coaxial along an axis and having respective inner faces, wherein the disks are axially spaced apart and are joined to each other by a plurality of pins, the pins defining between them a plurality of channels; the disks each having a circumference, at least some of the pins being outermost pins, the outermost pins being positioned between the two disks near the circumferences of the disks, the outermost pins being spaced apart from each other;
  at least one damping wire made of elastically deformable material and comprising an intermediate portion which is positioned between the two disks and radially outward of the outermost pins, the intermediate portion having a wavy profile and being elastically deformed in the direction parallel to said axis so as to be forced against the inner faces of the disks, the damping wire having two ends;
  wherein the damping wire has a respective fastening portion near each end, wherein the fastening portions are bent radially inwardly within a space between two adjacent outermost pins and which respectively engage the two adjacent outermost pins so as to secure the damping wire in position.

11. A brake disk according to claim 10, wherein the damping wire is coupled to said rotor exclusively via the fastening portions.

12. A brake disk according to claim 11, wherein the fastening portions are exclusively coupled to the pins.

13. A brake disk according to claim 10, wherein said wire damping element has a constant cross section along its entire length.

14. A brake disk according to claim 10, wherein at least one of said fastening portions is hook-shaped, so as to terminate with a tip directed radially outward, and is wound around a radially inner end of a corresponding the two adjacent outermost pins pin.

15. A brake disk according to claim 14, wherein both said fastening portions are hook-shaped.

16. A brake disk according to claim 10, wherein the brake is defined by said rotor and by said damping wire; and wherein said damping wire is wound around said rotor by an angle close to 360°.

17. A brake disk according to claim 10, wherein said intermediate portion consists of a plurality of waves whose tips directly rest onto said faces.

18. A brake disk according to claim 10, wherein both fastening portions are hook-shaped, so as to terminate with a respective end directed radially outward, and wherein the damping wire near each end is wound around a radially inner end of a corresponding one of the two adjacent outermost pins.

* * * * *